March 27, 1956 A. FRIED ET AL 2,739,497
TOOL FOR REMOVING BURRS, CHAMFERING, RECESSING AND THE LIKE
Filed Sept. 21, 1950

ARMIN FRIED,
JOSEPH W. FRIED,
INVENTORS.

BY Hazard & Miller

ATTORNEYS.

United States Patent Office 2,739,497
Patented Mar. 27, 1956

2,739,497
TOOL FOR REMOVING BURRS, CHAMFERING, RECESSING AND THE LIKE

Armin Fried and Joseph W. Fried, Burbank, Calif.

Application September 21, 1950, Serial No. 185,964

3 Claims. (Cl. 77—73.5)

This invention relates to a tool for removing burrs, chamfering, recessing and performing similar operations. It may be considered as an improvement over the tool for chamfering, recessing and the like disclosed in U. S. Letters Patent No. 2,314,084, issued March 16, 1943, to Armin Fried.

In the patent above referred to there is a rotary shaft or spindle adapted to be mounted in the chuck of a drill press or the like so as to be rotatable thereby in a previously-formed hole. This shaft or spindle has a longitudinally extending groove therein in which is pivoted a cutter. A collar is rotatable relatively to the shaft or spindle and is also longitudinally movable thereon between limits. The collar is effective to cause the cutter to swing upon its pivot within the groove to assume either a position wherein the cutting edges of the cutter are projected laterally beyond the sides of the shaft or spindle, or to assume another position wherein the cutter is completely housed within the groove. The construction as disclosed in the above mentioned patent has proven quite satisfactory in relatively large sizes. However, the design of the tool has limitations when it is desired to make a tool of that character in relatively small sizes in that the depth of groove required to accommodate the pivotal movement of the cutter is such as to materially weaken the shaft or spindle if the shaft or spindle has a very small diameter.

An object of the present invention is to provide an improved tool of this character which, although it may be advantageously made and used in large sizes, is susceptible of being made and used in sizes that are quite small.

More specifically, an object of the invention is to provide a tool of this character wherein there is a shaft or spindle having a longitudinal groove therein presenting a cam surface. A cutter is longitudinally slidable in this groove onto and off of the cam surface so as to be projected thereby from the side of the spindle in cutting position or allowed to assume a retracted position disposed wholly within the groove.

Another object of the invention is to provide a novel and simple means of positively retracting the cutter into its retracted position by means of the collar and after the cutter has been advanced by means of the collar to lock the cutter in its advanced position.

With the foregoing and other objects in view, which will be made manifest in the following detailed description and specifically pointed out in the appended claims, reference is had to the accompanying drawings for an illustrative embodiment of the invention, wherein:

Figure 1:
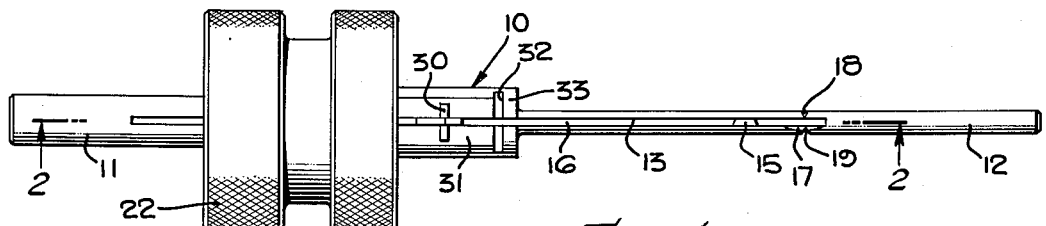
Figure 1 is a top plan view of the improved tool embodying the present invention.
Figure 2:
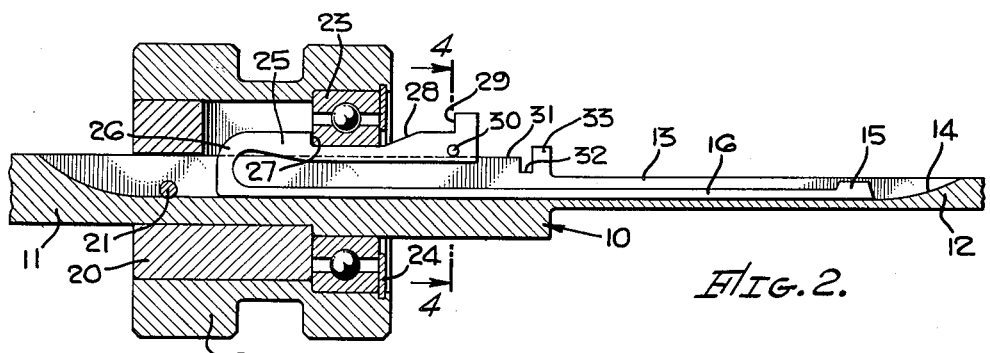
Fig. 2 is a vertical section taken substantially upon the line 2—2 upon Fig. 1, the cutter being shown in its fully retracted position.
Figure 3:
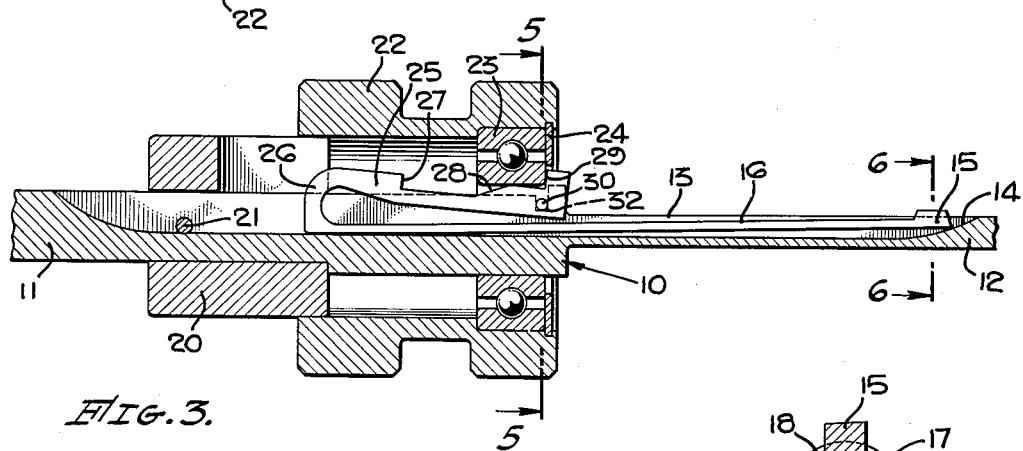
Fig. 3 is a sectional view similar to Fig. 2 but illustrating the cutter in its projected or advanced position.
Figures 4, 5:
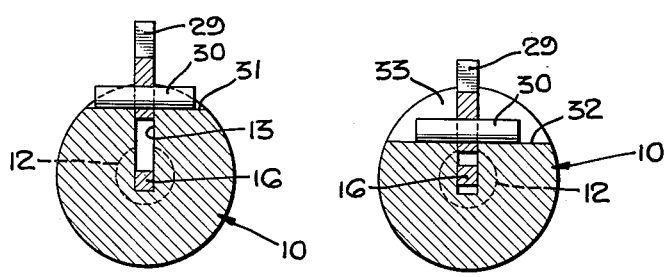
Fig. 4 is a sectional view taken substantially upon the line 4—4 upon Fig. 2.
Fig. 5 is a sectional view taken substantially upon the line 5—5 upon Fig. 3.
Figure 6:
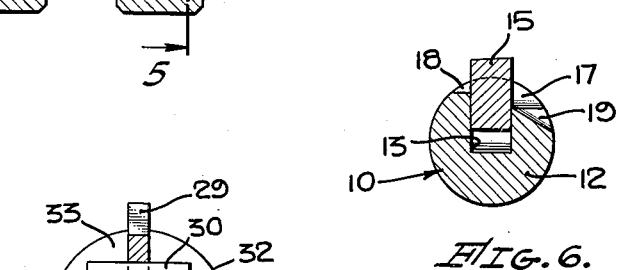
Fig. 6 is a sectional view taken substantially upon the line 6—6 of Fig. 3.

Referring to the accompanying drawings wherein similar reference characters designate similar parts throughout, the improved tool consists of a shaft or spindle, generally indicated at 10, the end 11 of which is adapted to be mounted in the chuck of a drill press or equivalent rotating instrumentality. The end 12 is of reduced diameter and, as above explained, the diameter of this end may be made quite small inasmuch as the present invention is highly susceptible of being made in small sizes. A groove or keyway 13 is formed in the shaft or spindle so as to extend longitudinally thereof and the end 14 of this groove curves toward the surface of the end 12 as shown in Figs. 2 and 3 so as to in effect provide a cam surface.

Within the groove 13 there fits a cutter 15 having a relatively long shank 16 integral therewith. This cutter and shank are preferably formed of a tool steel capable of being ground and hardened and the shank 16 is of sufficient length so that it will possess the required spring or resiliency necessary in assuming the position shown in Fig. 3 in contrast to the position shown in Fig. 2. In the position shown in Fig. 2, the cutter 15 and its shank 16 are disposed wholly within the groove 13 whereas in the position shown in Fig. 3 the cutter and shank have been shifted longitudinally of the shaft or spindle 10 so that the back of the cutter 15 has been caused to rise on the cam surface 14 thus causing the cutting edges on the cutter to project laterally from the surface of the end 12. The shaft or spindle 10 is cut away, as indicated at 17, opposite the position assumed by the cutter 15 when projected, as shown in Fig. 3. This cutaway portion provides a chip throat for cuttings removed from the work by the cutter 15. Notches 18 and 19 may be formed in the spindle opposite the center of the cutter while in this position and these notches may be filled with a colored enamel which, while the shaft or spindle is rotating, will indicate the exact center of the cutter 15 when the cutter is in projected position.

On the large end 11 of the shaft or spindle there is secured a bushing 20 that may be pinned in place such as by a pin 21. A collar 22 is slidable on this bushing between the positions shown in Figs. 2 and 3. This collar contains an anti-friction bearing 23 that is retained therein such as by a retainer 24. The end of the shank 16 has a finger 25 preferably integral therewith and connected to the shank such as by a reverse bend indicated at 26. The finger 25 has a shoulder 27 engageable by one side of the anti-friction bearing 23 in retracting the cutter from the position shown in Fig. 3 to the position shown in Fig. 2. The finger 25 also presents an inclined edge 28 engageable by the bearing 23 to advance the cutter and its shank from the position shown in Fig. 2 to the position shown in Fig. 3. This edge also functions as a cam edge to depress the end of the finger from the position shown in Fig. 2 to the position shown in Fig. 3. The outer end of the finger has a shoulder 29 engageable by the bearing to limit forward or advancing movement of the collar relatively thereto. The forward end of the finger 25 carries a transverse pin 30 which normally slides on the flat top surface 31 on the large end of the spindle. This pin, however, is receivable in a transverse groove 32 extending across the flat surface 31 adjacent stop shoulders 33.

In the operation of removing burrs, chamfering or recessing, the small end 12 of the shaft or spindle is introduced into a previously drilled hole while the cutter 15 is in its retracted position. When the notches 18 and 19 are opposite the location where it is desired to make a cut, the collar 22 is shifted forwardly relative to the rotating shaft or spindle. The initial forward movement causes the anti-friction bearing 23 to engage the edge 28 and bodily shift the cutter 15, its shank 16 and finger 25 forwardly with the result that as the cutter 15 climbs the inclined surface or cam surface 14 it will be projected from the side of the spindle. Ultimately the transverse pin 30 will engage the stop shoulders 33, limiting forward movement of the finger 25. Continued movement of the collar 22 causes the anti-friction bearing 23 to climb the inclined edge 28 and thus depress the finger 25 causing the pin 30 to enter the groove 32. This locks the cutter in its advanced position as long as the collar 22 remains in the position shown in Fig. 3. When the cut is completed the collar 22 is returned from the position shown in Fig. 3 to the position shown in Fig. 2 and in so doing the anti-friction bearing 23 allows the resiliency of the reverse bend 26 to lift the finger 25 to pass the pin 30 out of the groove 32, thus unlocking the cutter for retracting movement. When the shoulder 27 is engaged by the bearing 23 the cutter is bodily shifted from the position shown in Fig. 3 to the position shown in Fig. 2, wherein it is completely housed within the groove 13.

When the device is in the position shown in Fig. 2, it will be observed that the shank 16 is bearing against the back of the groove throughout its entire length or at least a substantial portion thereof. Also, the finger 25 being prestressed or loaded to urge the inner race of the anti-friction bearing 23 laterally with respect to the body of the tool, causes the inner race to frictionally engage the back of the body of the tool. This frictional engagement of the inner race of the bearing coupled with the frictional engagement between the shank 16 and the back of the groove are sufficient to prevent longitudinal sliding of the collar and cutter from the position shown in Fig. 2 to the position shown in Fig. 3, even though the tool is mounted in a vertical position such as in a drill press.

It is also to be observed that when the cutter is in the projected position as shown in Fig. 3, that the extreme end of the shank or that portion which is immediately back of the cutter 15 is in direct bearing engagement with the cam surface 14 so that lateral pressure applied to the cutter is transmitted directly through the back of the cutter to the cam surface and from the cam surface through the small end 12 to the wall of the hole in the work that need be operated upon. Consequently, the cutter in this form of construction, when in projected position, is strongly backed by solid metal as distinguished from the construction disclosed in the patent herein referred to where the cutter is in effect at the end of an unsupported and relatively long cantilever beam pivoted to the body at a point relatively remote from the cutter.

From the above described construction it will be appreciated that an improved tool of this character has been provided which is of relatively simple yet sturdy construction. Its parts may be easily manufactured and assembled together and while it may be made in any reasonable size it can be very advantageously constructed in tools of sizes wherein the diameter of the small end 12 is quite small.

Various changes may be made in the details of the construction without departing from the spirit and scope of the invention as defined by the appended claims.

We claim:

1. A tool of the class described comprising a shaft or spindle having a longitudinal groove therein presenting a cam surface, a cutter slidable in the groove engageable with the cam surface so as to be advanced thereby laterally with respect to the spindle, a shank on the cutter disposed within the groove, a finger on the shank presenting opposed shoulders, a collar slidable on the spindle carrying means engageable with the shoulders to shift the cutter longitudinally in the groove, said finger presenting a cam surface between the shoulders engageable by a part of the collar to depress the finger when the cutter is in advanced position, and means on the finger engageable with the spindle for locking the cutter against retracting movement when the cutter is in fully advanced position.

2. A tool of the class described comprising a shaft or spindle having a longitudinal groove therein presenting a cam surface, a cutter slidable in the groove engageable with the cam surface so as to be advanced thereby laterally with respect to the spindle, a shank on the cutter disposed within the groove, a resilient finger on the shank, a collar rotatably mounted on the spindle and slidable relatively thereto, said collar being disposed about the finger, means on the collar for depressing the finger toward the spindle when the collar is caused to slide relatively thereto in one direction and to release the finger for expansive movement when the collar is caused to slide in the other direction, and means on the finger engageable with the spindle for locking the finger and consequently the shank and cutter against movement relatively to the spindle when the finger is depressed.

3. A tool of the class described comprising a shaft or spindle having a longitudinal groove therein presenting a cam surface, a cutter slidable in the groove engageable with the cam surface so as to be advanced thereby laterally with respect to the spindle, a shank on the cutter disposed within the groove, a reversely extending resilient finger on the shank, a collar rotatably mounted on the spindle and slidable relatively thereto, said collar being disposed about the finger, the finger having opposed shoulders thereon engageable by the collar for shifting the finger and consequently the shank and cutter longitudinally with respect to the spindle, means on the collar for depressing the finger towards the spindle when the collar is caused to slide relatively thereto in one direction and to release the finger for expansive movement when the collar is caused to slide in the other direction, and means on the finger engageable with the spindle for locking the finger and consequently the shank and cutter against movement relatively to the spindle when the finger is depressed.

References Cited in the file of this patent

UNITED STATES PATENTS

| Number | Name | Date |
|---|---|---|
| 389,389 | Josett | Sept. 11, 1888 |
| 1,608,154 | Anderson | Nov. 23, 1926 |
| 2,333,935 | Jones | Nov. 9, 1943 |
| 2,373,474 | Heyer | Apr. 10, 1945 |
| 2,438,558 | Hollander | Mar. 30, 1948 |